(12) United States Patent
Varadarajan et al.

(10) Patent No.: US 12,288,343 B2
(45) Date of Patent: Apr. 29, 2025

(54) METHODS AND SYSTEMS FOR RESTORATION OF LOST IMAGE FEATURES FOR VISUAL ODOMETRY APPLICATIONS

(71) Applicant: SAMSUNG ELECTRONICS CO., LTD., Suwon-si (KR)

(72) Inventors: Srenivas Varadarajan, Bangalore (IN); Anamika Sharma, Jabalpur (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 17/386,697

(22) Filed: Jul. 28, 2021

(65) Prior Publication Data

US 2022/0036565 A1 Feb. 3, 2022

(30) Foreign Application Priority Data

Jul. 31, 2020 (IN) .............................. 202041032913

(51) Int. Cl.
*G06K 9/00* (2022.01)
*G06T 7/00* (2017.01)
*G06T 7/11* (2017.01)
*G06T 7/246* (2017.01)
*G06T 7/269* (2017.01)

(52) U.S. Cl.
CPC ............ *G06T 7/246* (2017.01); *G06T 7/0002* (2013.01); *G06T 7/11* (2017.01); *G06T 7/269* (2017.01); *G06T 2207/30168* (2013.01)

(58) Field of Classification Search
CPC ............ G06T 7/73; G06T 7/246; G06T 7/579
See application file for complete search history.

(56) References Cited

U.S. PATENT DOCUMENTS

| 10,839,547 | B2 | 11/2020 | Gupta et al. |
| 2013/0063556 | A1* | 3/2013 | Russell ................... G06T 7/194 348/E13.001 |
| 2017/0004629 | A1* | 1/2017 | Zhao ........................ G06T 7/20 |

(Continued)

FOREIGN PATENT DOCUMENTS

| CN | 111133473 | 5/2020 |
| WO | 20180152214 | 8/2018 |

OTHER PUBLICATIONS

Liu, Min, and Tobi Delbruck. "ABMOF: A novel optical flow algorithm for dynamic vision sensors." arXiv preprint arXiv: 1805. 03988 (2018).*

(Continued)

*Primary Examiner* — Gregory A Morse
*Assistant Examiner* — Owais Iqbal Memon
(74) *Attorney, Agent, or Firm* — Morgan, Lewis & Bockius LLP

(57) ABSTRACT

The present disclosure provides a method of analyzing an image captured from an imaging device. The method includes receiving one or more images captured from a camera over a predetermined time period. Feature extraction and tracking are executed with respect to the received images. One or more features are detected as untracked features during the feature extraction and tracking. A geometrical prediction is executed with respect to the untracked features to predict one or more features and thereby achieving the one or more untracked features as the one or more tracked features.

16 Claims, 11 Drawing Sheets

(56) References Cited

U.S. PATENT DOCUMENTS

| | | | |
|---|---|---|---|
| 2017/0124693 A1* | 5/2017 | Ramalingam | G06T 7/70 |
| 2018/0122086 A1* | 5/2018 | Lu | G06T 7/246 |
| 2018/0286072 A1* | 10/2018 | Tsai | G05D 1/0246 |
| 2019/0007678 A1* | 1/2019 | Perez-Ramirez | H04N 19/172 |
| 2019/0007690 A1* | 1/2019 | Varadarajan | G06V 20/46 |
| 2019/0096081 A1* | 3/2019 | Gupta | G06T 5/00 |
| 2020/0219267 A1* | 7/2020 | Rebecq | G06T 7/596 |
| 2020/0265590 A1* | 8/2020 | Daniilidis | G06T 7/269 |

OTHER PUBLICATIONS

Liu, Min, and Tobi Delbruck. "ABMOF: A novel optical flow algorithm for dynamic vision sensors." arXiv preprint arXiv:1805.03988 (2018). (Year: 2018).*

Qin et al., "Online Temporal Calibration for Monocular Visual-Inertial Systems", 2018 IEEE/RSJ International Conference on Intelligent Robots and Systems (IROS) Madrid, Spain, Oct. 1-5, 2018, pp. 3662-3669.

Mueggler, et al., "The Event-Camera Dataset and Simulator: Event-based Data for Pose Estimation, Visual Odometry, and SLAM", arXiv:1610.083364v4 [cs.RO] Nov. 8, 2017; Davis dataset: http://rpg.ifi.uzh.ch/davis_data.html, 8 pages.

Rebecq, et al., "Real-time Visual-Inertial Odometry for Event Cameras using Keyframe-based Nonlinear Optimization", in British Mach. Vis. Conf. (BMVC), 2017, 12 pages.

Liu, et al., "ABMOF: A Novel Optical Flow Algorithm for Dynamic Vision Sensors", ArXiv:1805.03988v1 [cs.CV] May 10, 2018, pp. 1-11.

Choi et al., "Performance Evaluation of RANSAC Family", British Machine Vision Conference (2009), pp. 1-12.

Hoeffken, et al., "Temporal Prediction and Spatial Regularization in Differential Optical Flow", Advanced Concepts for Intelligent Vision Systems (2011), 10 pages.

* cited by examiner

100

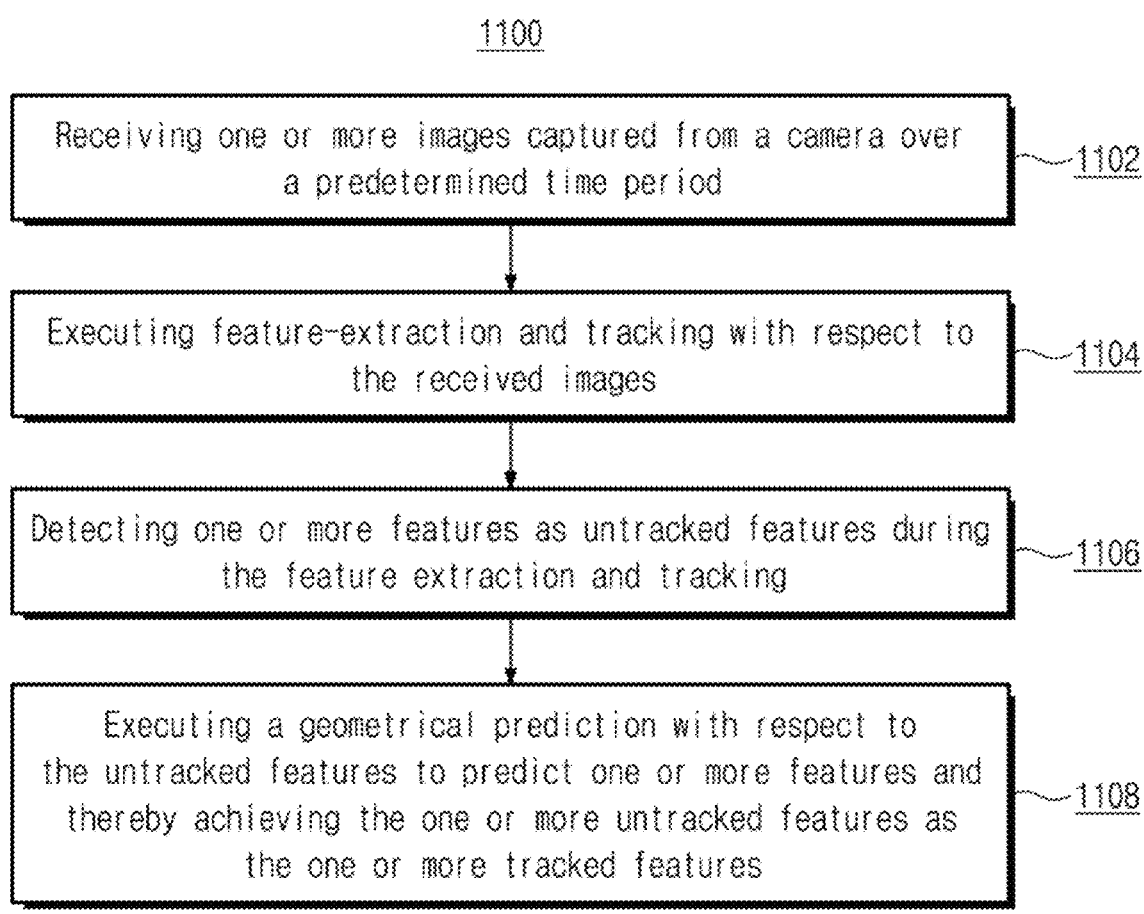

METHODS AND SYSTEMS FOR RESTORATION OF LOST IMAGE FEATURES FOR VISUAL ODOMETRY APPLICATIONS

CROSS-REFERENCE TO RELATED APPLICATION

This application claims priority to and the benefit of India Appln. No. 202041032913 filed on Jul. 31, 2020, the entire contents of which are incorporated by reference herein in their entirety.

TECHNICAL FIELD

The present disclosure generally relates to the restoration of lost image features and particularly relates to methods and systems for restoration of lost image features for visual odometry applications.

BACKGROUND

Dynamic Vision Sensor (DVS) is an event camera that captures the changes in pixel intensities asynchronously. Advantages compared to complementary metal oxide semiconductor (CMOS) image sensor (CIS) include a higher data rate (1000 Hz), a higher dynamic range (140 dB), and a low-power. Disadvantages of Raw DVS data include motion-dependent information, a low contrast DVS-image, and inconsistent DVS features. Due to the inconsistent DVS features across adjacent frames, optical flow-based DVS-feature tracking fails in some scenarios.

In some examples, video scans may be recorded by a moving camera through simultaneous localization and mapping (SLAM) technology. SLAM is used for both localization and mapping. For example, the localization may locate a person or artificial object such as a drone or Internet of Things (IoT) device in the house, and the mapping may construct a 3D scene structure of the house.

There is a need in the art for improved DVS restoration techniques.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for analyzing an image captured from an imaging device.

In accordance with some example embodiments of the inventive concepts, a method of analyzing an image captured from an imaging device is disclosed. The method includes receiving one or more images captured from a camera over a predetermined time period. The method includes performing a feature extraction and tracking operation (e.g., executing feature extraction and tracking) based on the received images. The method includes detecting one or more untracked features based on the feature extraction and tracking operation. The method further includes executing a geometrical prediction to predict one or more tracked features from the untracked features.

In accordance with some example embodiments of the inventive concepts, a system of analyzing an image captured from an imaging device is disclosed. The system includes a receiving unit configured to receive one or more images captured from a camera over a predetermined time period. The system includes an execution unit configured to perform a feature extraction and tracking operation on the received images. The system includes a detection unit configured to detect one or more untracked features based on the feature extraction and tracking operation. The system includes a prediction unit configured to execute a geometrical prediction to predict one or more tracked features from the untracked features.

In accordance with some example embodiments of the inventive concepts, a non-transitory computer readable medium storing code for analyzing an image captured from an imaging device is disclosed. The code comprises instructions executable by a processor to receive one or more images captured from a camera over a predetermined time period. The code comprises instructions executable by a processor to perform a feature extraction and tracking operation (e.g., executing feature extraction and tracking) based on the received images. The code comprises instructions executable by a processor to detect one or more untracked features based on the feature extraction and tracking operation. The code comprises instructions executable by a processor to execute a geometrical prediction to predict one or more tracked features from the untracked features.

These aspects and advantages will be more clearly understood from the following detailed description taken in conjunction with the accompanying drawings and claims.

BRIEF DESCRIPTION OF THE DRAWINGS

FIG. 11 illustrates a block diagram 1100 implementing a method for analyzing an image captured from an imaging device, in accordance with an embodiment of the present subject matter.

Figure 1:
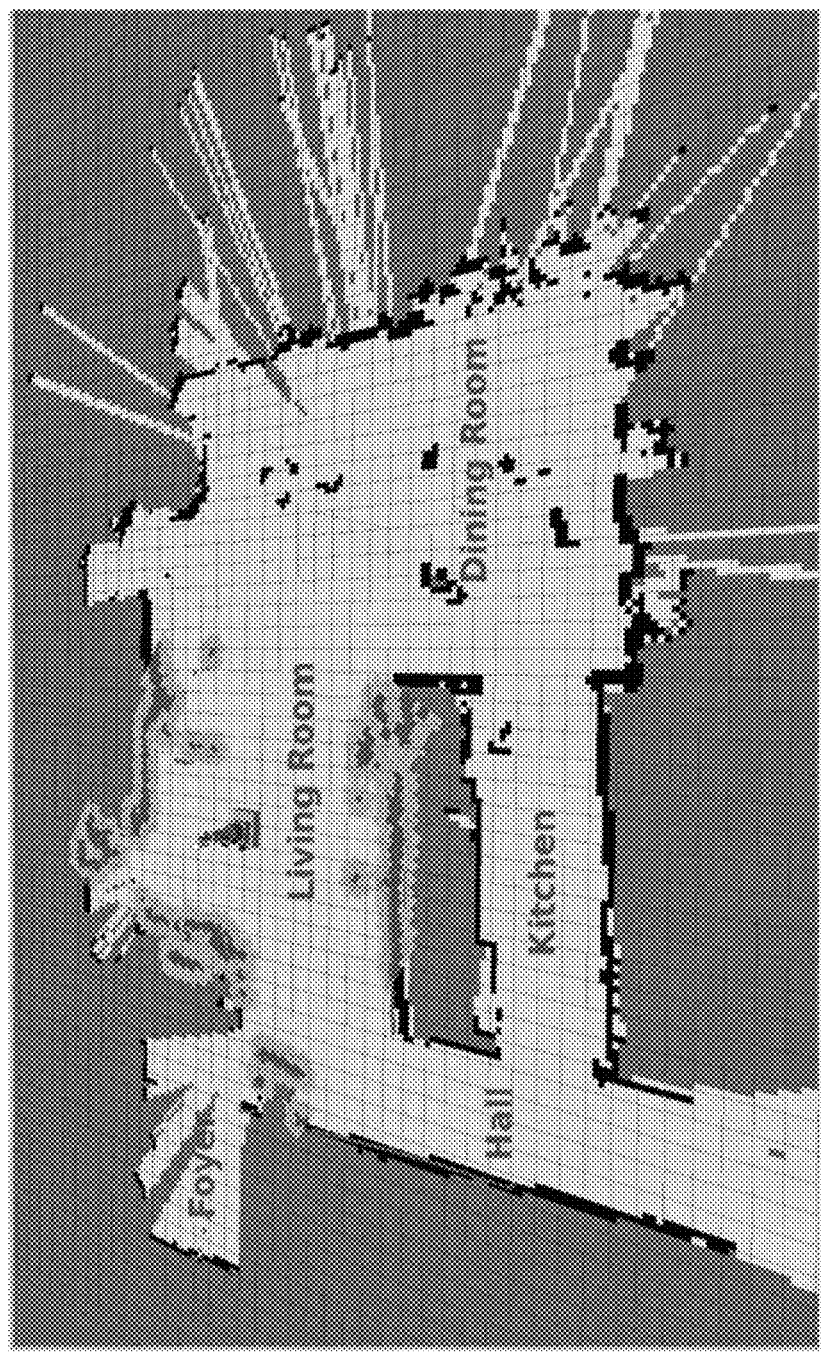
FIG. 1 illustrates a 3D representation 100 depicting the reconstruction of a house from video-scans recorded by a moving camera through simultaneous localization and mapping (SLAM) technology, according to an existing technique.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art with benefit of the description herein.

DETAILED DESCRIPTION

The present disclosure relates generally to the restoration of lost image features. More particularly, embodiments of the present disclosure relate to systems and methods for restoration of lost image features for visual odometry applications. In some embodiments, the present disclosure uses geometric prediction for restoration of Dynamic Vision Sensor (DVS) features lost during tracking, removes outlier predictions using an optical flow of reconstructed points in a local neighborhood, and performs noise adaptive restoration of tracked feature points.

A device may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information.

A pixel (e.g., a pixel sensor) may store information about received electromagnetic radiation (e.g., light). Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. A level of a voltage output from a photodiode may be proportional to the amount of charges output from the photodiode. That is, a level of a voltage output from a photodiode may be proportional to the amount of light received by the photodiode. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

A DVS is an event camera used to asynchronously capture changes in pixel intensities. The DVS includes a higher data rate (1000 Hz), a higher dynamic range (140 dB) and a lower power compared to other methods. RAW DVS data may produce motion-dependent information, have low contrast DVS-images, and inconsistent DVS features. Inconsistent DVS features across adjacent frames results in optical flow-based DVS-feature tracking failures in some scenarios.

The present disclosure provides a method of analyzing an image captured from an imaging device. The method includes receiving one or more images captured from a camera over a predetermined time period. Feature extraction and tracking are executed with respect to the received images. One or more features are detected as untracked features during the feature extraction and tracking. A geometrical prediction is executed with respect to the untracked features to predict features and thereby determining the untracked features as the tracked features.

For the purpose of promoting an understanding of the principles of the inventive concept, reference will now be made to the embodiment illustrated in the drawings and specific language will be used to describe the same. It will nevertheless be understood that no limitation of the scope of the inventive concept is thereby intended, such alterations and further modifications in the illustrated system, and such further applications of the principles of the inventive concept as illustrated therein being contemplated as would normally occur to one skilled in the art to which the inventive concept relates.

It will be understood by those skilled in the art that the foregoing general description and the following detailed description are explanatory of the inventive concept and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an example embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which the inventive concept belongs. The system, methods, and examples provided herein are illustrative only and not intended to be limiting.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2, and so on and so forth.

Embodiments of the present subject matter are described below in detail with reference to the accompanying drawings.

FIG. 1 illustrates a 3D representation 100 depicting the reconstruction of a house from video scans recorded by a moving camera through simultaneous localization and mapping (SLAM) technology, according to an existing technique. SLAM is used for both localization and mapping. The localization is to locate a person or artificial object such as a drone or IoT device in the house, and the mapping is to construct a 3D scene structure of the house.

Figure 2:
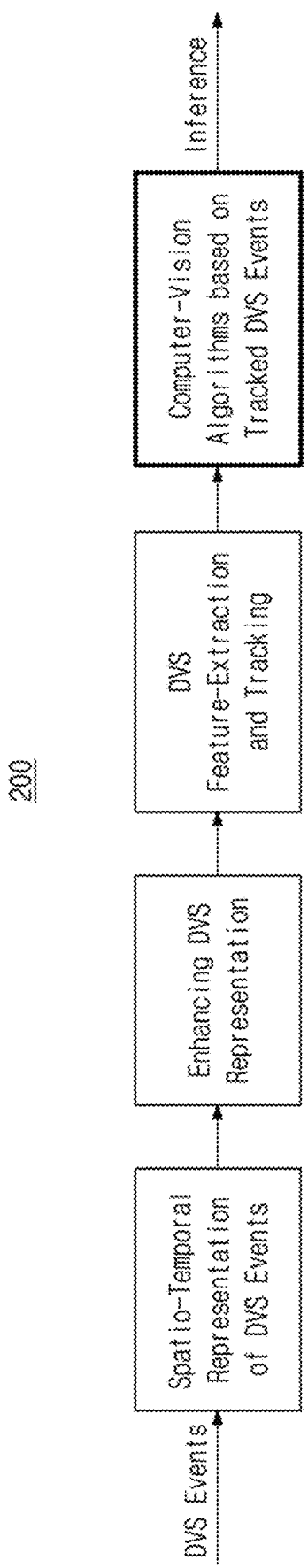
FIG. 2 illustrates a flow diagram 200 depicting a computer vision pipeline for using Dynamic Vision Sensor (DVS) Events from a sensor, according to an existing technique.

FIG. 2 illustrates a flow diagram 200 depicting a computer vision pipeline for using DVS Events from a sensor, according to an existing technique. According to the block diagram of FIG. 2, there is Spatio-Temporal Representation of DVS Events. The DVS images are formed through an accumulation of motion-compensated DVS events as a part of the DVS representation. Further, there are DVS Feature Extraction and Tracking blocks for detecting features in the images. Therefore, there are employed Computer-Vision Algorithms based on Tracked DVS features. In the computer vision pipeline for using DVS Events from the sensor, the Spatio-Temporal Representation of DVS Events through event-image may be used (merely as an example) for compatibility of operation with some image processing algorithms for feature detection and tracking.

Figure 3:
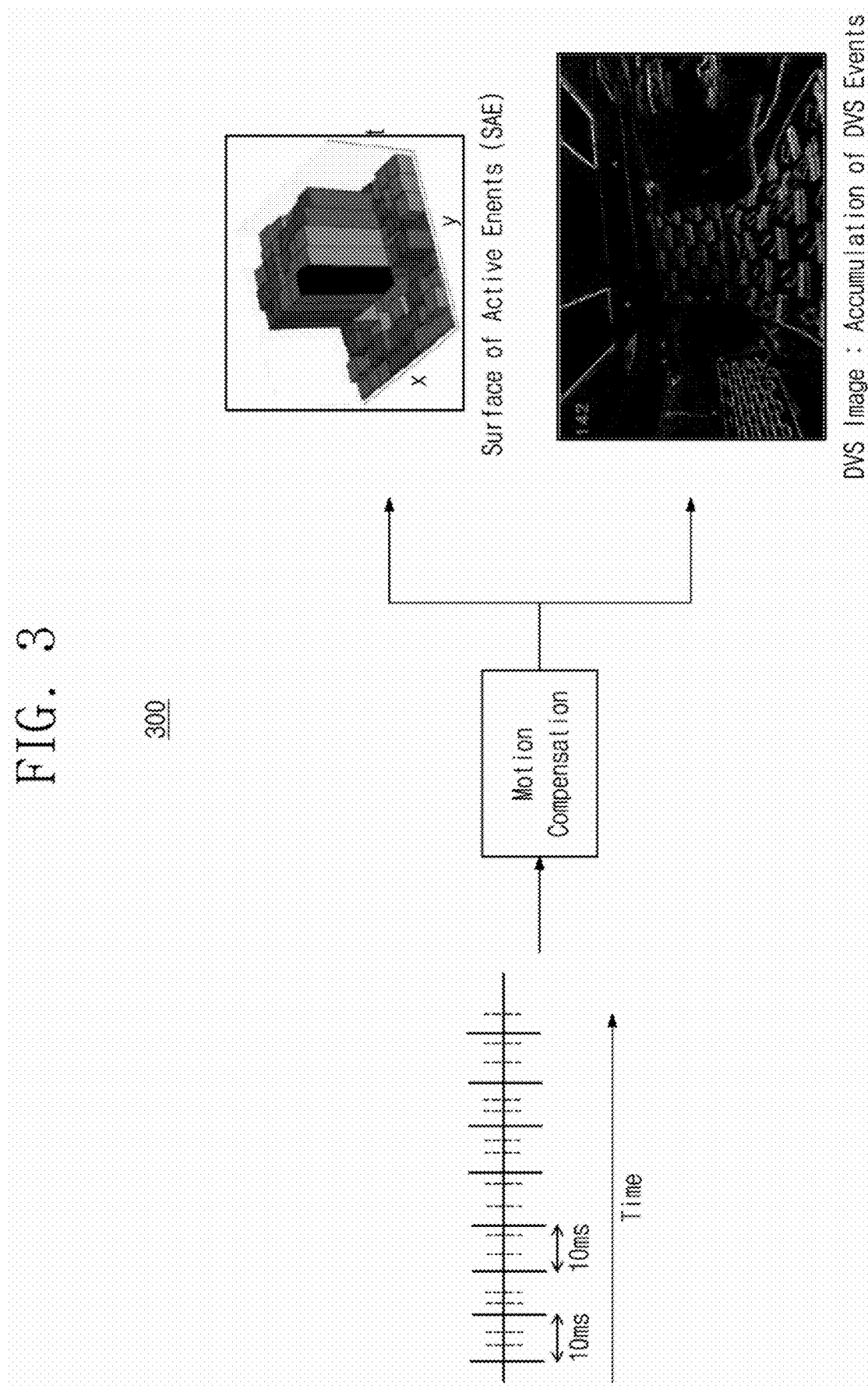
FIG. 3 illustrates a DVS Events Representation 300, according to an existing technique.

FIG. 3 illustrates an DVS Events Representation 300, according to an existing technique. In accordance with FIG. 3, the DVS Event e(x,y,t,p) occurs when:

$$I(x,y,t) - I(x,y,t-\Delta t) \geq p \cdot C \quad (1)$$

Variable C is the predefined Contrast Sensitivity Threshold and I is the logarithm of Intensity.

In accordance with FIG. 3, the graph indicates DVS Event Accumulation in SLAM. The graph has DVS frames at different time intervals. The dashed lines are DVS Event times, and the solid lines are DVS Image Creation times. Further, there is an image representation of DVS events through an accumulation of motion-compensated DVS events. After doing motion compensation, a DVS frame can be represented in 2 ways—Surface of Active Events or using a DVS Event Image. In the scenario shown in FIG. 3, there is an Address Event Representation (AER) for a DVS event that may include a four-element vector {x,y,t,p}, mentioning the location (x,y), timestamp (t), and the polarity (p) of the event.

Figure 4:
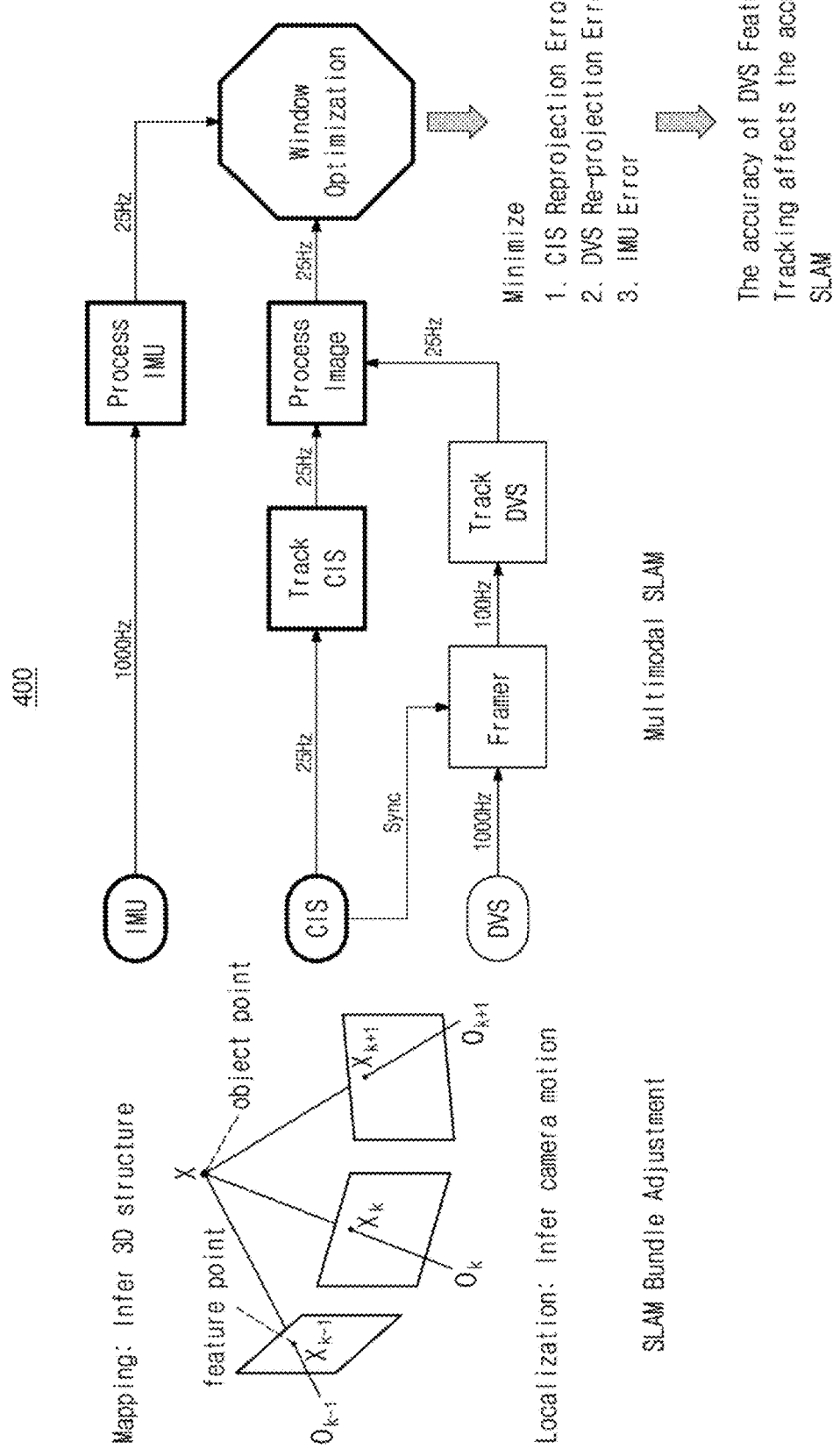
FIG. 4 illustrates a DVS stream used in the SLAM, according to an existing technique.

FIG. 4 illustrates a DVS stream 400 used in the SLAM, according to an existing technique. FIG. 4 illustrates SLAM bundle adjustment where the mapping infers the 3D structure and localization infers the DVS camera motion. Further, a multimodal SLAM flow diagram is shown. The windowed bundle adjustment minimizes the CIS Re-projection Error, DVS Re-projection Error, and the IMU Error. Hence the accuracy of DVS Feature Tracking affects the bundle adjustment cost function and the accuracy of the SLAM algorithm.

Figure 5:
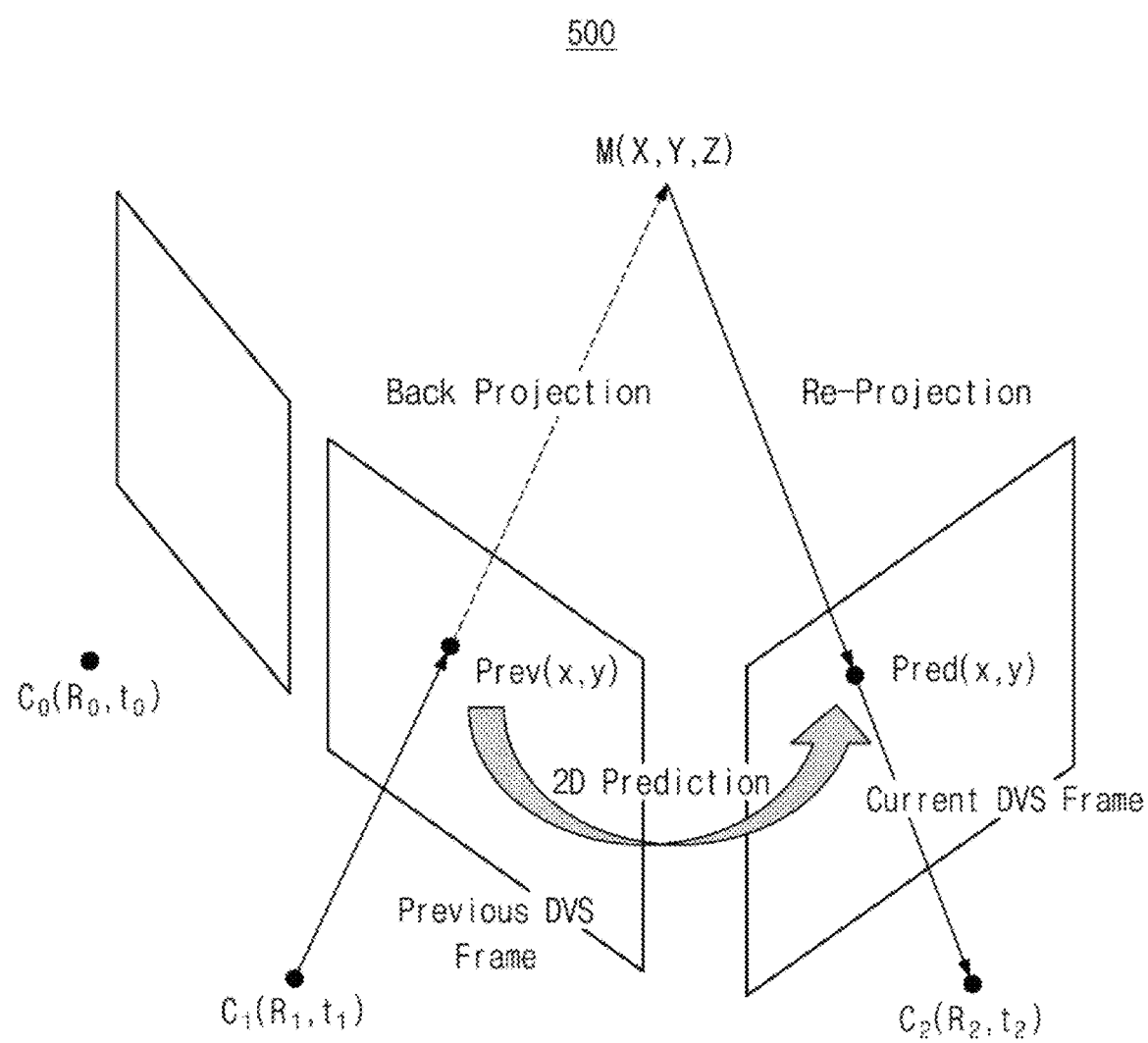
FIG. 5 illustrates a diagram depicting a geometric prediction for 2D features, according to an existing technique.

FIG. 5 illustrates a diagram 500 depicting a geometric prediction for 2D features, according to an existing technique. In an example embodiment, a current camera pose P2 is predicted from the previous camera poses P1 and P0 as follows:

$$P_2 = P_1 P_0^{-1} P_1 \quad (2)$$

$$P_x = \begin{bmatrix} R_x & t_x \\ 0 & 1 \end{bmatrix} \quad (3)$$

Further, a 2D DVS feature point, $Prev_{x,y}$, in the previous frame with depth 'k' inferred from bundle adjustment, is back-projected to form a 3D point M.

$$M = \begin{bmatrix} k * Prev_x \\ k * Prev_y \\ k \\ 1 \end{bmatrix} \quad (4)$$

This 3D point M is re-projected to form a predicted point $Pred_{x,y}$ in the current frame.

$$Pred_{x,y} = P_2 M \quad (5)$$

Figure 6:
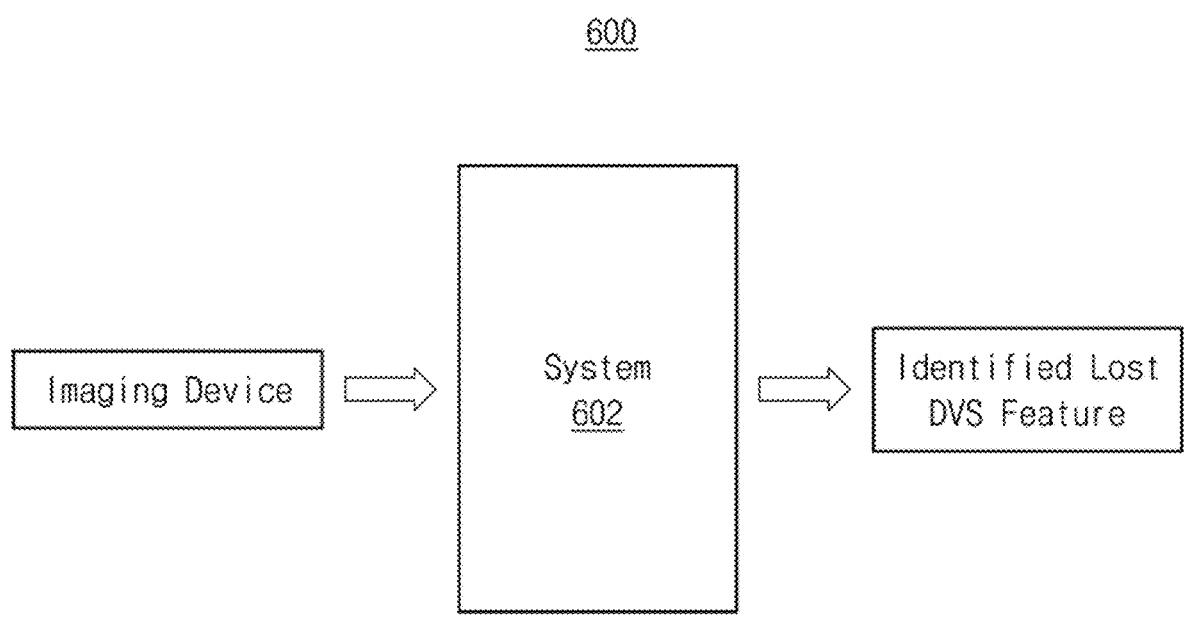
FIG. 6 illustrates an environment implementing a system of analyzing an image captured from an imaging device, in accordance with an embodiment of the present subject matter.

FIG. 6 illustrates an environment 600 implementing a system 602 for analyzing one or more images captured from an imaging device, in accordance with an embodiment of the present subject matter. In an example embodiment, system 602 may be configured to receive one or more images from the imaging device for analysis. One or more images may be analyzed to restore one or more lost DVS features from one or more images. The one or more lost DVS features may be referred as one or more untracked features to be predicted as one or more tracked features amongst a number of features.

Examples of the imaging device may include, but are not limited to, a DVS-based imaging device, a CMOS sensor-based imaging device, etc. The restoration of one or more lost DVS features may be based on a geometrical prediction and an outlier removal performed on the image.

A device may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

According to an embodiment of the present subject matter, the system 602 may be configured to receive one or more images from the imaging device. In an example embodiment, one or more images may be received over a predetermined period of time. The system 602 may be configured to extract and track the number of features with respect to one or more images received from the imaging device. Additionally, or alternatively, the system 602 may be configured to determine one or more untracked features from the number of features.

In accordance with the present subject matter, upon determining one or more untracked features, the system 602 may be configured to execute a geometrical prediction with respect to one or more untracked features. The geometrical prediction may be performed to predict one or more features that remained untracked during the extraction as one or more tracked features.

In some examples, system 602 may be a virtual reality (VR) system. VR is a computer technology that generates an artificial sensory environment for a user. In some cases, VR systems use virtual reality headsets, sometimes in combination with physical spaces or multi-projected environments, to generate realistic images, sounds and other sensations that simulates a user's physical presence in a virtual or imaginary environment. A person using virtual reality equipment is able to "look around" the artificial world, and with high quality VR move about in it and interact with virtual features or items. VR headsets are head-mounted goggles with a screen in front of the eyes. Programs may include audio and sounds through speakers or headphones. VR systems that include transmission of vibrations and other sensations to the user through a game controller or other devices are known as haptic systems. This tactile information is generally known as force feedback in medical, video gaming and military training applications. Virtual reality also refers to remote communication environments which provide a virtual presence of users with through telepresence and telexistence or the use of a virtual artifact (VA). The immersive environment can be similar to the real world in order to create a lifelike experience grounded in reality or sci-fi. Augmented reality systems may also be considered a form of VR that layers virtual information over a live camera feed into a headset, or through a smartphone or tablet device. Modern VR displays may be based on technology developed for smartphones including: gyroscopes and motion sensors for tracking head, hand, and body positions; small HD screens for stereoscopic displays; and small, lightweight and fast processors. Production of VR images and video may be facilitated by the use of omnidirectional cameras, also known as 360-degree cameras or VR cameras, that have the ability to record in all directions, although at low-resolutions or in highly compressed formats for online streaming. In contrast, photogrammetry is increasingly used to combine several high-resolution photographs for the creation of detailed 3D objects and environments in VR applications.

Figure 7:
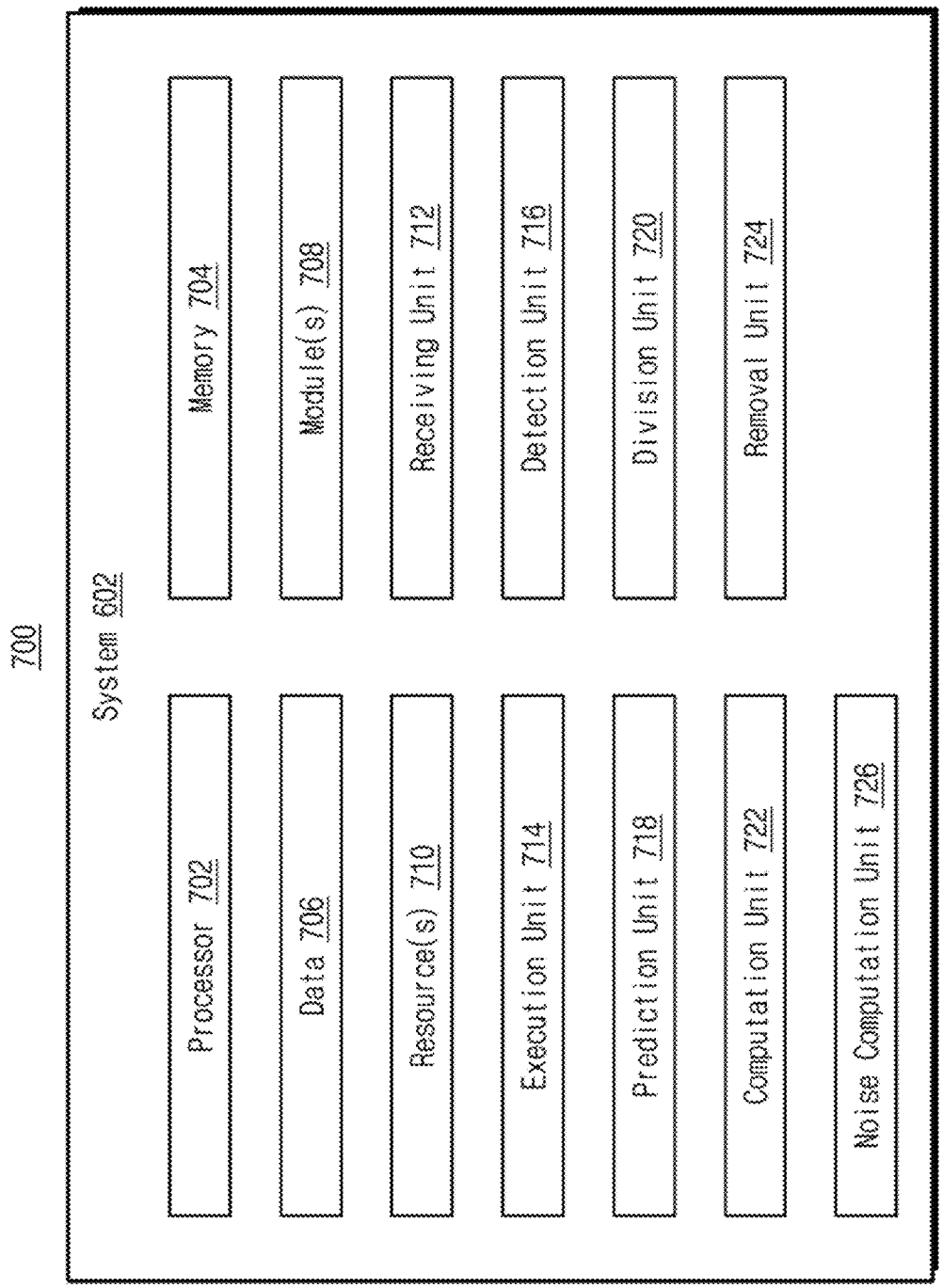
FIG. 7 illustrates a schematic block diagram of the system for analyzing an image captured from an imaging device, in accordance with an embodiment of the present subject matter.

FIG. 7 illustrates a schematic block diagram 700 of the system 602 for analyzing one or more images captured from an imaging device, in accordance with an embodiment of the present subject matter. In an example embodiment, the imaging device may be DVS camera and one or more images may be captured to restore lost DVS features from one or more images. The one or more lost DVS features may be referred as one or more untracked features to be predicted as one or more tracked features amongst a number of features. Furthermore, the restoration of one or more lost DVS features may be based on a geometrical prediction and an outlier removal performed on the image. The restoration may be based on performing a noise computation of one or more images. Further, the geometric prediction may include performing a projection and a re-projection of one or more images.

In an example embodiment, the system 602 includes a processor 702, a memory 704, data 706, module(s) 708, resource(s) 710, a receiving unit 712, an execution unit 714, a detection unit 716, a prediction unit 718, a division unit 720, a computation unit 722, a removal unit 724, and a noise computation unit 726. The processor 702, the memory 704, the data 706, the module(s) 708, the resource(s) 710, the receiving unit 712, the execution unit 714, the detection unit 716, the prediction unit 718, the division unit 720, the computation unit 722, the removal unit 724, and the noise computation unit 726, may be communicatively coupled to one another.

The system 602 may be one or more of a hardware, a software, a logic-based program, a configurable hardware, and the like. For example, the processor 702 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 702 may be configured to fetch and/or execute computer-readable instructions and/or data 706 stored in the memory 704.

A processor 702 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 702 is configured to operate a memory 704 (e.g., a memory array) using a memory controller. In other cases, a memory controller is integrated into the processor 702. In some cases, the processor 702 is configured to execute computer-readable instructions stored in a memory 704 to perform various functions. In some embodiments, a processor 702 includes special purpose components for modem processing, baseband processing, digital signal processing, or transmission processing.

In an example, the memory 704 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 704 may include the data 706.

The data 706 serves, amongst other things, as a repository for storing data processed, received, and generated by one or more of the processor 702, the memory 704, the data 706, the module(s) 708, the resource(s) 710, the receiving unit 712, the an execution unit 714, the detection unit 716, the prediction unit 718, the division unit 720, the computation unit 722, the removal unit 724, and the noise computation unit 726. In an example embodiment, the data 706 may include one or more images received from the imaging device for restoring the lost DVS features.

A database is an organized collection of data 706. For example, a database may store data 706 in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

The module(s) 708, amongst other things, may include routines, programs, objects, components, data structures, etc., which perform particular tasks or implement data types. The module(s) 708 may also be implemented as, signal processor(s), state machine(s) 208, logic circuitries, and/or any other device or component that manipulate signals based on operational instructions.

Further, the module(s) 708 may be implemented in hardware, instructions executed by at least one processing unit, such as a processor, or by a combination thereof. The processing unit may be a general-purpose processor which executes instructions to cause the general-purpose processor to perform operations or, the processing unit may be dedicated to performing specific functions. In another aspect of the present disclosure, the module(s) 708 may be machine-readable instructions (software) which, when executed by a processor/processing unit, may perform any of the described functionalities.

In some example embodiments, the module(s) 708 may be machine-readable instructions (software) which, when executed by a processor/processing unit, perform any of the described functionalities. For example, software may include code to implement aspects of the present disclosure. Software may be stored in a non-transitory computer-readable medium such as system memory or other memory. In some cases, the software may not be directly executable by the processor 702 but may cause a computer (e.g., when compiled and executed) to perform functions described herein.

The resource(s) 710 may be physical and/or virtual components of the system 602 that provide inherent capabilities and/or contribute towards the performance of the system 602. Examples of the resource(s) 710 may include, but are not limited to, a memory (e.g., the memory), a power unit (e.g., a battery), a display unit, etc. The resource(s) 710 may include a power unit/battery unit, a network unit, etc., in addition to the processor 702, and the memory 704.

Additionally, or alternatively, the receiving unit 712 may be configured to communicate with the imaging device to receive one or more images. In an example embodiment, the receiving unit 712 may be configured to communicate with the imaging device via one of a number of wireless communication standards. Examples of the wireless communication standards may include, but are not limited to, 3G, 4G, 5G, Bluetooth, Infrared. In an example embodiment, the receiving unit 712 may be configured to communicate with the imaging device via a number of wired communication standards. Examples of the wired communication standards may include, but are not limited to, LAN, MAN, WAN. Upon receiving one or more images, the receiving unit 712 may be configured to transmit one or more images to the execution unit 714 incorporated within the system 602.

For example, in some cases, receiving unit 712 may be configured to communicate bi-directionally, via antennas, wired, or wireless links as described above. For example, the receiving unit 712 may represent a wireless transceiver and may communicate bi-directionally with another wireless transceiver. The receiving unit 712 may also include or be connected to a modem to modulate the packets and provide the modulated packets to for transmission, and to demodulate received packets. In some examples, receiving unit 712 may be tuned to operate at specified frequencies. For example, a modem can configure the receiving unit 712 to operate at a specified frequency and power level based on the communication protocol used by the modem.

Moving forward, upon receiving one or more images from the receiving unit 712, the execution unit 714 may be configured to perform an extraction and tracking of a number of features in one or more images. In an example embodiment, the number of features associated with one or more images may determine the quality of one or more images.

In an example embodiment, the detection unit 716 may be configured to detect one or more features from the number of features. Further, one or more features may be the features that remained untracked during the extraction and tracking of the number of features. The detection unit 716 may indicate that the quality of one or more images may be decreased where it is determined that one or more features remained untracked.

Upon the detection of one or more features amongst the number of features as the untracked feature, the prediction unit 718 may be configured to predict one or more features. In an example embodiment, the prediction of one or more features may be performed to track and extract one or more features in one or more images detected to be untracked by the detection unit 716. The prediction unit 718 may be configured to predict one or more features by performing a geometrical prediction with respect to one or more features amongst the number of features.

In an example embodiment, the execution of the geometrical prediction with respect to the untracked features causes restoration of the untracked features within one or more images for facilitating a computer vision process. Based on the geometrical prediction, one or more features may be extracted and tracked, and referred to as a part of the number of features of one or more images tracked and extracted by the execution unit 714.

Continuing with the above embodiment, performing the geometrical prediction may include predicting a feature point on a target frame. In an example embodiment, the feature point may be computed through back-projection and re-projection of features on the target frame. Further, the prediction of the feature point to the target frame may correspond to the target frame associated with one or more features.

Additionally, or alternatively, the division unit 720 may be configured to divide one or more images into one or more local regions. In an example embodiment, one or more regions in one or more images may be defined by capturing one or more of at least one feature point of homogenous depth and a plurality of reconstructed feature points.

Further, the computation unit 722 may be configured to compute an outlier removal threshold based on optical flows of sparsely tracked features in one or more local regions. Additionally, or alternatively, the removal unit 724 may be configured to remove one or more predicted features pertaining to the geometrical prediction exceeding the outlier removal threshold.

In an example embodiment, the noise computation unit 726 may be configured to execute a noise computation for one or more images. Upon executing the noise computation, the noise computation unit 726 may be configured to evaluate one or more images as less or high noisy based on the computation. Furthermore, the noise computation unit 726 may be configured to consider the less noisy image for the prediction of the features corresponding to the untracked features.

Figure 8:
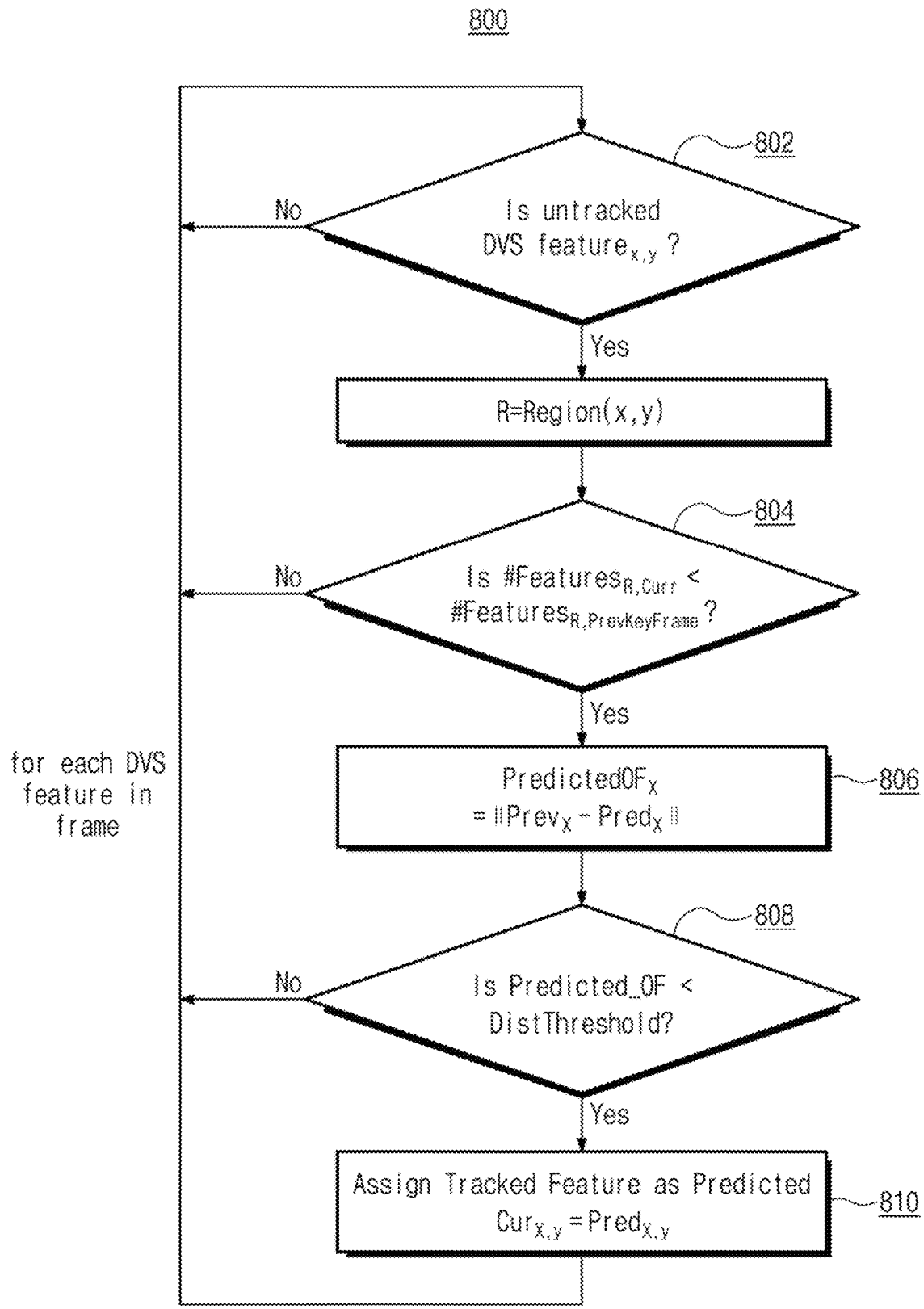
FIG. 8 illustrates an operational flow diagram depicting a process for predicting one or more untracked features in one or more images, in accordance with an embodiment of the present subject matter.

FIG. 8 illustrates an operational flow diagram 800 depicting a process for predicting one or more untracked features in one or more images, in accordance with an embodiment of the present subject matter. In an example embodiment, the prediction may be performed upon analyzing one or more images captured from an imaging device.

In an example embodiment, the process includes determining (step 802) presence of one or more untracked features. Determining the presence of one or more untracked features includes performing feature extraction and tracking one or more images. The process initiates again for another feature where it is determined that one or more features in one or more images may be tracked. The process may proceed to step 804 where it is determined that one or more features of one or more images may be untracked.

In an example embodiment, at step 804, the process includes determining whether one or more features associated with a current frame of one or more images is less than one or more features associated with a previous frame of one or more images. One or more features associated with a current frame of one or more images may be represented as #Features$_{R, Curr}$ and one or more features associated with a previous frame may be represented as #Features$_{R, PrevKy\text{-}Frame}$. The current frame may include a region R containing one or more features.

In an example embodiment, determining whether one or more features in the current frame is less than one or more features in the previous frame may be based on a back-projection and a re-projection of one or more features associated with the previous frame when imaging device poses are available. The process may proceed to step 806 where it is determined that one or more features in the current frame is less than one or more features in the previous frame. The process may backtrack to step 802 where it is determined that one or more features in the current frame is greater than one or more features in the previous frame.

Additionally, or alternatively, at step 806, the process may include calculating optical flows of one or more sparsely tracked features in one or more local regions. In an example embodiment, one or more tracked features may be referred as one or more features sparsely tracked features. The one or more regions may be the region R. In an example embodiment, the optical flow may be calculated by, $$\text{PredictedOF}_x = \|\text{Prev}_x - \text{Pred}_x\| \quad (6)$$

where, PredictedOF$_x$ is the optical flow, Prevx is a 2D DVS feature point in the previous frame, and Predx is a predicted feature point, computed through the back-projection and the re-projection of features.

The process includes determining (step 808) whether the optical flow calculated in the step 806 is less than a threshold value of an outlier removal or not. In an example embodiment, the threshold value may be referred as "DistThreshold". The "DistThreshold" may be calculated based on computing an outlier removal threshold based on the optical flows of one or more tracked features in one or more local regions. The "DistThreshold" may be based on a local average of the optical flow associated with one or more features tracked in one or more local regions. The process may backtrack to step 802 where it is determined that the optical flow is greater than the threshold value of the outlier removal. The process may proceed to step 810, where it is determined that the optical flow is less than the threshold value.

In an example embodiment, at step 810, the process includes determining one or more untracked features as one or more tracked features.

Figure 9:
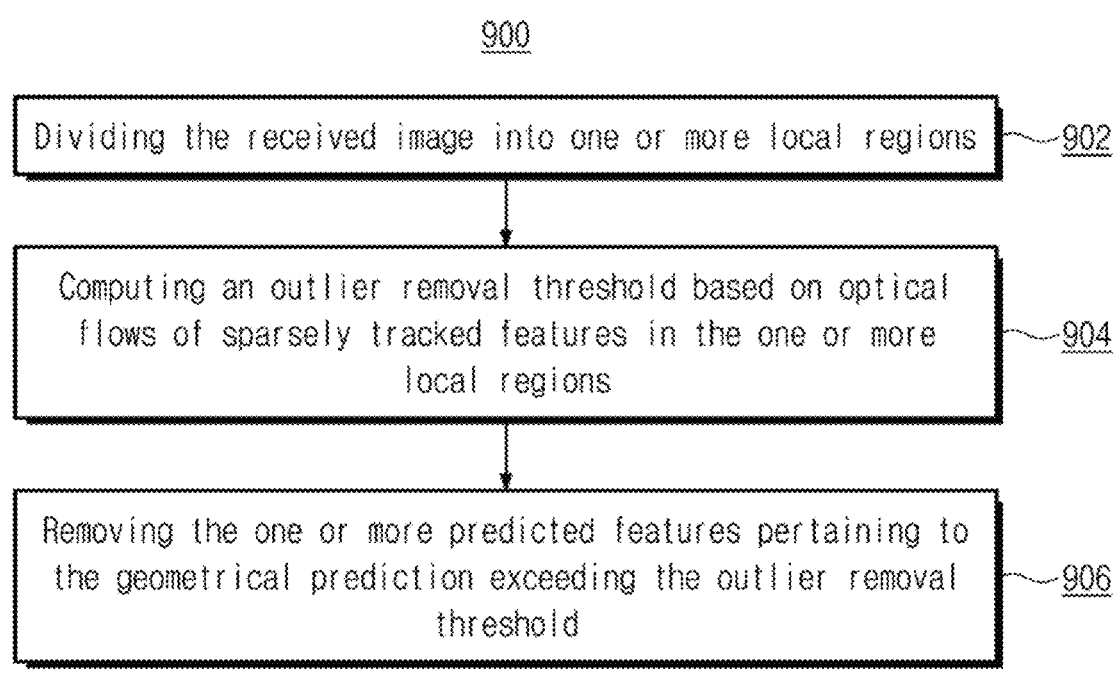
FIG. 9 illustrates an operational flow diagram depicting a process for a region based outlier removal, in accordance with an embodiment of the present subject matter.

FIG. 9 illustrates an operational flow diagram 900 depicting a process for a region-based outlier removal, in accordance with an embodiment of the present subject matter.

In an example embodiment, at step 902, the process includes dividing one or more images into one or more local regions. In an example embodiment, one or more regions within one or more images may be defined by capturing one or more of feature points of homogenous-depth and a plurality of reconstructed feature points.

At step 904, the process includes computing an outlier removal threshold based on optical flows of one or more tracked features in one or more local regions.

Additionally, or alternatively, at step 906, the process includes removing one or more features related to the geometrical prediction exceeding the outlier removal threshold.

$$\text{DistThreshold}_x = K * \frac{1}{N_R} \sum_{i \in (1, NR)} |OFx(i)| \quad (7)$$

$$\text{DistThreshold}_y = K * \frac{1}{N_R} \sum_{i \in (1, NR)} |OFy(i)| \quad (8)$$

$$\text{PredOF}_{x,y} = \|\text{Prev}_{x,y} - \text{Pred}_{x,y}\| \quad (9)$$

$$\text{Outlier}_{x,y} = \quad (10)$$
$$\begin{cases} 1 & \text{if } \text{PredOF}_x > \text{DistThresholdx} \| (\text{PredOF}_y > \text{DistThresholdy}) \\ 0 & \text{otherwise} \end{cases}$$

Figure 10:
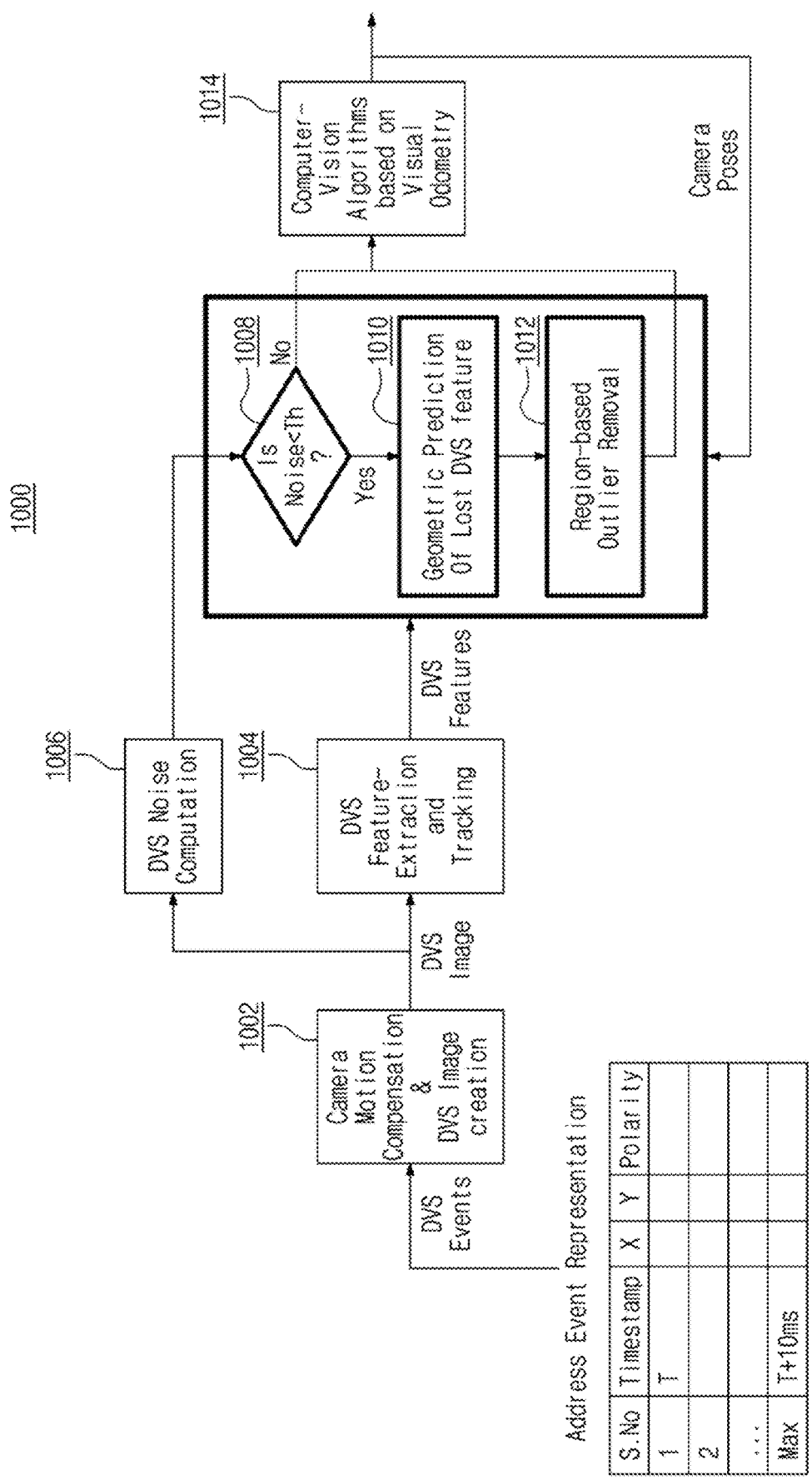
FIG. 10 illustrates an operational flow diagram depicting a process for analyzing one or more images captured from an imaging device, in accordance with an embodiment of the present subject matter.

FIG. 10 illustrates an operational flow diagram 1000 depicting a process for analyzing one or more images captured from an imaging device, in accordance with an embodiment of the present subject matter. In an example embodiment, the analysis of one or more images may be performed by the system 602 as referred to in the FIG. 6. Further, the analysis may be performed to determine one or more untracked features associated with one or more images and converting one or more untracked features into one or more tracked features. Determining one or more untracked features may be based on performing a geometrical prediction with respect to one or more untracked features.

Examples of the imaging device may include, but are not limited to, a DVS-based imaging device, and a CMOS sensor-based imaging device. In an example embodiment, one or more tracked features and one or more untracked features may be referred as DVS features. Further, one or more untracked features being identified as one or more tracked features may be referred as lost DVS features.

In an example embodiment, at step 1002, the process may include a number of captured DVS events at motion-compensated pixel locations of one or more images. In an example embodiment, the number of captured DVS events may be accumulated upon receiving one or more images from the imaging device.

Upon accumulating the number of DVS events, at step 1004, the process may proceed to executing feature extraction and tracking with respect to one or more images. In an example embodiment, feature extraction and tracking may be performed to extract and track a number of features associated with one or more images. Further, features amongst the number of features upon extraction and tracking may be referred as one or more tracked features. In an example embodiment, the feature extraction and the tracking of one or more tracked features may be performed by the execution unit 714 as referred to in the FIG. 7.

The process may include detecting one or more untracked features during the feature extraction and the tracking. The tracking of one or more untracked features may be performed by the detection unit 716 as referred to in the FIG. 7.

Additionally, or alternatively, at step 1006 upon extracting and tracking one or more features, the process may proceed to computing a DVS noise associated with one or more images. In an example embodiment, the DVS noise may be calculated by the noise computation unit 726 as referred to in the FIG. 7.

Additionally, or alternatively, the process may include evaluating (step 1008) one or more images as one of the high noisy images and less noisy images based on the computation performed in the step 1006. In an example embodiment, the evaluation may include comparing the DVS noise associated with one or more images with a predetermined threshold value associated with the noise.

Upon determining that the DVS noise is greater than the predetermined threshold value, one or more images may be evaluated as highly noisy images. In an example embodiment, where it is determined that the DVS noise is less than the predetermined threshold, one or more images may be evaluated as the less noisy images. The process may proceed to step 1014 where it is determined that one or more images are evaluated as the high noisy images. Further, in an example embodiment, the process may proceed to step 1010 where it is determined that one or more images are evaluated as the less noisy images.

Additionally, or alternatively, at step 1010, the process may proceed to predicting one or more untracked features as one or more tracked features. In an example embodiment, the predicting may be based on performing a geometric prediction with respect to one or more untracked features amongst the number of features. The geometric prediction may include prediction of a feature point computed through back-projection and re-projection of features on a target frame. The prediction of the feature point to the target frame may correspond to one or more untracked features. The geometric prediction may be performed by the prediction unit 718 as referred to in the FIG. 7.

At step 1012, the process may proceed to removing the predicted one or more untracked features as outliers. In an example embodiment, the removal may include dividing one or more images into one or more local regions by the division unit 720 as referred to in the FIG. 7. The one or more regions in one or more images may be defined by capturing one or more of at least one feature point of homogenous depth and a plurality of reconstructed feature points.

Upon dividing one or more images, the process may proceed to computing an outlier removal threshold based on optical flows of one or more sparsely tracked features in one or more local regions. In an example embodiment, the computation may be performed by the computation unit 722 as referred to in the FIG. 7. The process may further include removing one or more predicted features pertaining to the geometrical prediction exceeding the outlier removal threshold. The one or more predicted features may be removed by the removal unit 724 as referred to in the FIG. 7. Additionally, or alternatively, at step 1014, the process may include applying some computer-vision algorithms based on the tracked DVS Events.

FIG. 11 illustrates a block diagram 1100 implementing a method for analyzing an image captured from an imaging device, in accordance with an embodiment of the present subject matter. In an example embodiment, the method may be based on a geometrical prediction and an outlier removal. Further, the method may be performed by the system 602 using components thereof, as described above. The method may be performed by the receiving unit 712, the execution unit 714, the detection unit 716, the prediction unit 718, the division unit 720, the computation unit 722, the removal unit 724, and the noise computation unit 716. Further, for the sake of brevity, details of the present disclosure that are explained in detail in the description of FIG. 1 to FIG. 10 are not explained in detail in the description of FIG. 11.

At block 1102, the method includes receiving one or more images captured from a camera over a predetermined time period. At block 1104, the method includes executing feature extraction and tracking with respect to the received images. At block 1106, the method includes detecting one or more features as untracked features during the feature extraction and tracking. At block 1108, the method includes executing a geometrical prediction with respect to the untracked features to predict one or more features and thereby achieving one or more untracked features as one or more tracked features.

While specific language has been used to describe the present disclosure, any limitations arising on account thereto, are not intended. As would be apparent to a person in the art, various working modifications may be made to the method to implement the inventive concepts as taught herein. The drawings and the foregoing description give examples of embodiments. Those skilled in the art will appreciate that the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

What is claimed is:

1. A method of analyzing an image captured from a DVS (dynamic vision sensor), the method comprising:
   receiving a plurality of images captured from the DVS over a predetermined time period;
   performing a feature extraction and tracking operation on the received images, wherein a plurality of features of the received images are tracked;
   determining that one or more of the plurality of features tracked in a previous frame of the received images have become untracked in a current frame of the received images during the feature extraction and tracking operation by performing back-projection on the one or more of the plurality of features in the previous frame to form a three-dimensional (3D) point and performing re-projection of the one or more of the plurality of features from the 3D point to the current frame; and
   executing a geometrical prediction to predict that one or more of the untracked features in the current frame correspond to tracked features of the plurality of features tracked in the previous frame,
   wherein the untracked features in the current frame predicted to correspond to the tracked features in the plurality of features tracked in the previous frame are predicted features in the current frame, and
   wherein the one or more of the plurality of tracked features in the previous frame of the received images are determined to have become untracked in the current frame due to a failure of the tracking operation.

2. The method of claim 1, further comprising:
   dividing the received images into one or more local regions;
   computing an outlier removal threshold based on optical flows of sparsely tracked features in the one or more local regions; and
   removing one or more of the predicted features predicted from the geometrical prediction based on the outlier removal threshold, and remaining predicted features are determined as tracked features of the current frame.

3. The method of claim 2, wherein the one or more local regions within the received images are defined by capturing one or more of: feature points of homogenous-depth and a plurality of reconstructed feature points.

4. The method of claim 2, further comprising:
   determining whether the received images are noisy images, based on the outlier removal threshold and sizes of the optical flows,
   wherein, in response to the sizes of the optical flows being smaller than the outlier removal threshold, the executing of the geometrical prediction is performed, and wherein, in response to the sizes of the optical flows being greater than the outlier removal threshold, the removing of the one or more predicted features predicted from the geometrical prediction is performed.

5. The method of claim 1, wherein executing the geometrical prediction to predict the one or more tracked features causes restoration of untracked features within the image for facilitating a computer vision process.

6. A system of analyzing an image captured from a DVS (dynamic vision sensor), the system comprising:
   a receiving unit configured to receive a plurality of images captured from the DVS over a predetermined time period;
   an execution unit configured to perform a feature extraction and tracking operation on the received images, wherein a plurality of features of the received images are tracked;
   a detection unit configured to detect that one or more of the plurality of features tracked in a previous frame of the received images have become untracked in a current frame of the received images during the feature extraction and tracking operation by performing back-projection on the one or of the plurality of features in the previous frame to form a three-dimensional (3D) point and performing re-projection of the one or more of the plurality of features from the 3D point to the current frame; and
   a prediction unit configured to execute a geometrical prediction to predict that one or more of the untracked features in the current frame correspond to tracked features in the previous frame,
   wherein the untracked features in the current frame predicted to correspond to the tracked features in the plurality of features tracked in the previous frame are predicted features in the current frame, and
   wherein the one or more of the plurality of tracked features in the previous frame of the received images are determined to have become untracked in the current frame due to a failure of the tracking operation.

7. The system of claim 6, further comprising:
   a division unit configured to divide the received images into one or more local regions;
   a computation unit configured to compute an outlier removal threshold based on optical flows of sparsely tracked features in the one or more local regions; and
   a removal unit configured to remove one or more of the predicted features predicted from the geometrical prediction based on the outlier removal threshold, and remaining predicted features are determined as tracked features of the current frame.

8. The system of claim 7, wherein the one or more local regions within the images are defined by capturing one or more of:
   feature points of homogenous-depth;
   a plurality of reconstructed feature points.

9. The system of claim 7, further comprising:
   a noise computation unit configured to determine whether the received images are noisy images, based on the outlier removal threshold and sizes of the optical flows,
   wherein, in response to the sizes of the optical flows being smaller than the outlier removal threshold, the prediction unit is configured to perform the executing of the geometrical prediction, and
   wherein, in response to the sizes of the optical flows being greater than the outlier removal threshold, the removal unit is configured to perform the removing of the one or more predicted features predicted from the geometrical prediction.

10. The system of claim 6, wherein executing the geometrical prediction to predict the one or more tracked features causes restoration of untracked features within the image for facilitating a computer vision process.

11. A non-transitory computer readable medium storing code for analyzing an image captured from a DVS (dynamic vision sensor), the code comprising instructions executable by a processor to:
    receive a plurality of images captured from the DVS over a predetermined time period;
    perform a feature extraction and tracking operation on the received images, wherein a plurality of features of the received images are tracked;
    determine that one or more of the plurality of features tracked in a previous frame of the received images have become untracked in a current frame of the received images during the feature extraction and tracking operation by performing back-projection on the one or more of the plurality of features in the previous frame to form a three-dimensional (3D) point and performing re-projection of the one or more of the plurality of features from the 3D point to the current frame; and
    execute a geometrical prediction to predict that one or more of the untracked features in the current frame correspond to tracked features of the plurality of features tracked in the previous frame,
    wherein the untracked features in the current frame predicted to correspond to the tracked features in the plurality of features tracked in the previous frame are predicted features in the current frame, and
    wherein the one or more of the plurality of tracked features in the previous frame of the received images are determined to have become untracked in the current frame due to a failure of the tracking operation.

12. The non-transitory computer readable medium of claim 11, the code further comprising instructions executable by the processor to:
    divide the received images into one or more local regions;
    compute an outlier removal threshold based on optical flows of sparsely tracked features in the one or more local regions; and
    remove one or more of the predicted features predicted from the geometrical prediction based on the outlier removal threshold, and remaining predicted features are determined as tracked features of the current frame.

13. The non-transitory computer readable medium of claim 12, wherein the one or more local regions within the received images are defined by capturing one or more of:
    feature points of homogenous-depth and a plurality of reconstructed feature points.

14. The non-transitory computer readable medium of claim 12, the code further comprising instructions executable by the processor to:
    determine whether the received images are noisy images, based on the outlier removal threshold and sizes of the optical flows;
    in response to the sizes of the optical flows being smaller than the outlier removal threshold, perform the executing of the geometrical prediction; and
    in response to the sizes of the optical flows being greater than the outlier removal threshold, perform the removing of the one or more predicted features predicted from the geometrical prediction.

15. The non-transitory computer readable medium of claim 11, wherein executing the geometrical prediction to predict the one or more untracked features causes restoration of untracked features within the image for facilitating a computer vision process.

16. The method of claim 4, further comprising:
performing, based on the executing of the geometrical prediction and the removing of the one or more predicted features predicted from the geometrical prediction, a localization and a mapping associated with the received images.

* * * * *